(No Model.)
J. M. WADDEL.
ANIMAL TRAP.
No. 432,743. Patented July 22, 1890.
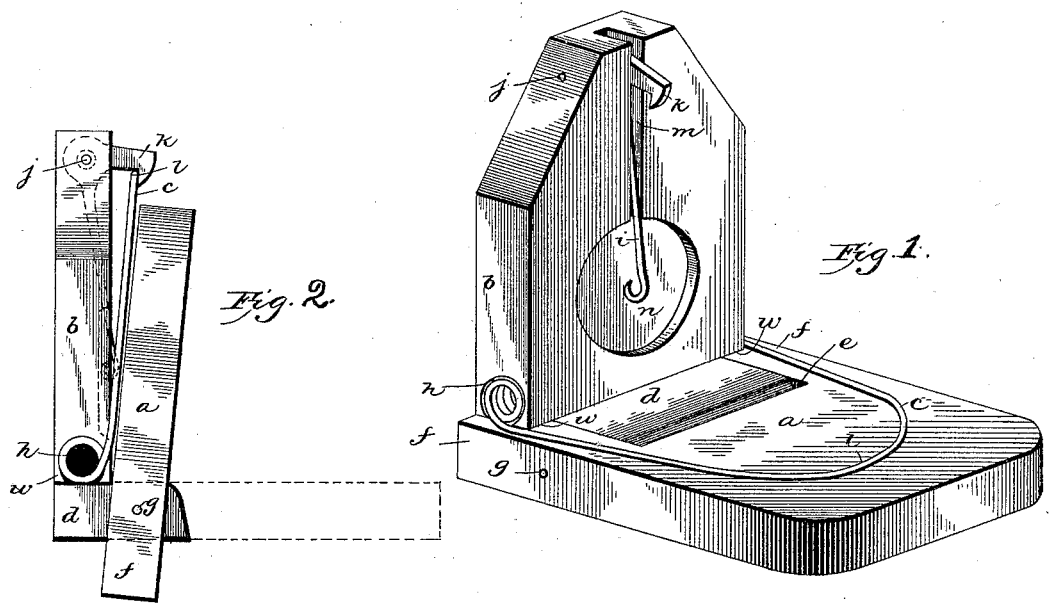
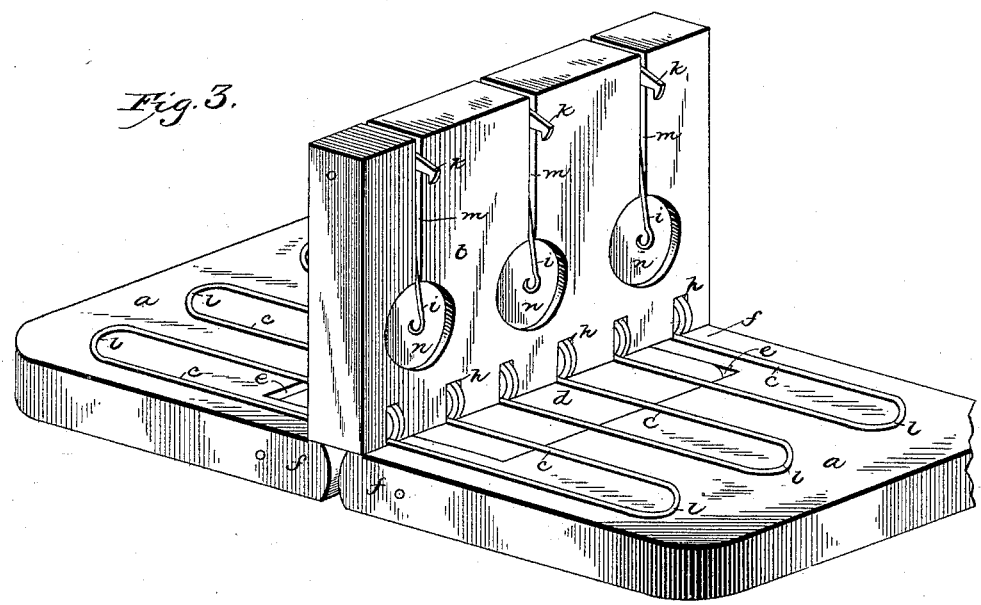
WITNESSES
F. L. Ourand
T. P. Davis
INVENTOR
John M. Waddel
per A. G. Du Bois
His Attorney

UNITED STATES PATENT OFFICE.

JOHN M. WADDEL, OF GREENFIELD, OHIO.

ANIMAL-TRAP.

SPECIFICATION forming part of Letters Patent No. 432,743, dated July 22, 1890.

Application filed December 19, 1889. Serial No. 334,266. (No model.)

*To all whom it may concern:*

Be it known that I, JOHN M. WADDEL, a citizen of the United States, residing at Greenfield, in the county of Highland and State of Ohio, have invented certain new and useful Improvements in Animal-Traps; and I do hereby declare the following to be a full, clear, and exact description of the invention, such as will enable others skilled in the art to which it appertains to make and use the same.

My invention relates to that class of animal-traps in which a spring bar, loop, or other device snaps down upon the animal's body.

The object I wish to attain is to provide a trap which can be more easily set and which will be simple, cheap, strong, and durable.

With these ends in view my invention consists in the peculiar features and combinations of parts, more fully described hereinafter, and pointed out in the claims.

Referring to the accompanying drawings, Figure 1 represents a side elevation of the trap when sprung; Fig. 2, a perspective view showing the trap set, the base being turned up against the bottom of the spring when serving as a handle to set the trap, and dotted lines represent the position of the base when turned down ready to receive the victim; and Fig. 3, a modification showing a double trap, in which the pivoted base is located upon both sides of the upright carrying the hooks, and the snaps are multiplied to six instead of one.

The reference-letter $a$ represents the base or platform of the trap, and $b$ a standard to which the snap or spring $c$ is attached. A laterally-projecting offset-section $d$ is rigidly secured to the bottom of the base and projects into a recess $e$ in the end of the base. The arms $f$, formed by the recess $e$ in the base, extend upon opposite sides of and are secured to the rigid section $d$ by means of pivots $g$. The section $d$ is made narrower than the standard $b$ to form shoulders $w$, against which the ends of arms $f$ come in contact to hold the base in rectangular adjustment relative to the standard. The pivots $g$ are located just in front of and below the bottom of the standard $b$, or, in other words, out of vertical alignment with the latter, in order to permit the base to fold up freely when the trap is being set, and in so doing the base-section pushes against the bottom of the spring-arm, and the latter slides over the surface and beyond the end of the base, whereby the trigger is permitted to engage the free end of the spring-arm and hold it in readiness to be sprung; hence it will be seen that the vertical standard $b$ and folding base $a$ form two folding sections, which, when closed, set the trap, and when open one serves as a platform or base for the other. The snap or spring-arm $c$ consists, by preference, of a single piece of wire bent in the form of a U-shaped loop with coiled ends, which are secured within a chamber $h$, bored horizontally through the bottom of the standard in the ordinary way.

The trigger for holding the loop back consists of a downwardly-extending shank $i$, having a bait-hook upon its lower extremity and a laterally-extending arm provided with a catch $k$ for engaging the free end $l$ of the spring-loop upon its upper extremity, the whole forming a bell-crank lever in general outline. This trigger is hung upon the pivot $j$, which passes transversely through the upper part of the standard and sits within a vertical slot $m$, the lower end of which terminates at the depression $n$, which receives the bait-hook and bait.

In the modification shown in Fig. 3 the same general construction is employed, the only difference being that a double folding base and six spring-loops and triggers are employed. By this arrangement it will be seen that all six loops can be set in the single operation of pressing the bases together.

In using my invention the operator, when the loop is down, as in Fig. 1, takes the trap in his hands and presses the free ends of the folding sections together to the position shown in Fig. 2. In this operation the base serves as a lever or handle to press the spring back until it is caught by the trigger. The base is now turned down to a rectangular position, as shown in dotted lines in Fig. 2, and the trap is ready to receive its victim. In bringing the base up against the standard it is seen that the base will come in contact with the bait-hook upon the lower end of the trigger and press it back into the bait-receiving recess, thereby pushing out the catch upon the upper end in position to engage the free end of the loop. The trap can be set equally as well, if not better, by the foot as by the hand by placing it upon the ground and pressing the two sections together with the foot.

Among the advantages my device possesses over the old kind might be mentioned the ease with which it can be set, the safety of performing this operation, and the simplicity and durability of its parts.

Besides the modification before mentioned it is evident that many slight changes which might suggest themselves to a skilled mechanic could be resorted to without departing from the spirit and scope of my invention. Therefore I do not limit myself to the precise construction shown.

Having thus described my invention, what I claim as new, and desire to secure by Letters Patent, is—

1. The combination, in an animal-trap, of a pair of folding sections, one of which constitutes a standard and the other a base portion, an offset rigidly secured to one of the sections, a pivot upon said offset, a spring attached to one section and having its free end arranged to bear upon and slide over the other until it projects beyond the latter, and a trigger and bait-hook, all arranged and adapted to operate in the manner and for the purpose substantially as described.

2. The combination, in an animal-trap, of a pair of folding sections, one of which is provided with an offset, to which the other is pivoted, a spring having its axis located off the pivotal point of the sections, whereby the free end of the spring is made to slide over the surface and project beyond the end of the opposing section, and a trigger adapted to engage said free end, in the manner and for the purpose substantially as described.

3. In an animal-trap, a pair of folding sections, one of which is provided with an offset, to which the other is pivoted, a coil-spring located within a transverse bore through one of the sections and having its free end bearing against the opposite section, in the manner and for the purpose substantially as described.

In testimony whereof I affix my signature in presence of two witnesses.

JOHN M. WADDEL.

Witnesses:
R. G. DuBois,
F. P. Davis.